3,759,837
SYNTHESIS GAS PRODUCTION BY
PARTIAL OXIDATION
Roger M. Dille, La Habra, and Warren G. Schlinger, Pasadena, Calif., assignors to Texaco Inc., New York, N.Y.
No Drawing. Continuation-in-part of applications Ser. No. 664,312, Aug. 30, 1967, Ser. No. 692,306, Dec. 21, 1967, and Ser. No. 649,490, June 28, 1967. This application June 26, 1969, Ser. No. 836,977
Int. Cl. C07c 1/02
U.S. Cl. 252—373
15 Claims

ABSTRACT OF THE DISCLOSURE

In a high pressure synthesis gas generating process, continuous control of the pH in the system may be accomplished by determining the nitrogen in the primary hydrocarbon fuel and oxygen-enriched gas fed to the generator, supplementing said nitrogen with a controlled amount of nitrogen in the form of nitrogen containing compounds, synthesizing ammonia in the system, and continuously neutralizing all or a portion of the formic acid produced in the system with the ammonia synthesized in the system and with additions of supplemental ammonia from an external source. Carbon-steel process equipment and piping is thereby protected from corrosion and system upsetting emulsions are prevented from forming in the carbon recovery zone.

This application is a continuation-in-part of our applications Ser. No. 664,312 filed Aug. 30, 1967, Ser. No. 692,306 filed Dec. 21, 1967, and Ser. No. 649,490 filed June 28, 1967.

BACKGROUND OF THE INVENTION

Field of the invention

This invention relates to the production of synthesis gas. More particularly it relates to improvements in the partial oxidation process for generating hydrogen and carbon monoxide which prevent the build-up of corrosive formic acid, excess ammonia, emulsions, and gelatinous precipitates.

Description of the prior art

Until recently, the highest pressure levels used commercially for the production of synthesis gas (mixtures of hydrogen and carbon monoxide) by the partial oxidation of a hydrocarbon fuel was about 550 p.s.i.g. We have found that when the hot product gases from a high pressure synthesis gas generator operating at pressures above about 600 p.s.i.g. were cooled by quenching in water, the quench water became acidic. This acidic condition causes any carbon-steel piping, valves, fittings and other equipment in the system made from ordinary carbon-steel to corrode. Neutralization of the acidic quench water solely by large additions of a chemical alkali from an external source was found to be ineffective and expensive. High costs make it undesirable to replace all of the carbon-steel piping and components in the system with parts made from special corrosion-resistant alloys. Furthermore, alloy-cladding the heavy walled carbon-steel vessels required for the high pressure partial oxidation process involve many practical problems.

SUMMARY

In the process for making synthesis gas by partial oxidation, a hydrocarbon fuel (called the primary fuel) is enriched with supplemental amounts of nitrogen containing compounds and the blended mixture is then reacted with an oxygen containing gas at a pressure in the range of about 600 to 3000 p.s.i.g. The hot product gas is cooled in quench water whose pH is continuously controlled by neutralizing all or a portion of the formic acid produced in the system with ammonia synthesized in the system and supplemental additions of ammonia from an external source.

The nitrogen content of said primary hydrocarbon fuel and said oxygen containing gas are determined and based on the amount of nitrogen present, a supplemental amount of nitrogen in the form of nitrogen containing organic compounds or in the form of ammoniacal compounds is introduced into the reaction zone, for example in admixture with said primary hydrocarbon fuel. Ammonia is continuously synthesized in the reaction and quench zones by the non-catalytic reaction of nitrogen and nitrogen radicals with a portion of the hydrogen being simultaneously produced by the process. The supplemental amount of ammonia from an external source, in the form of anhydrous ammonia or ammoniacal compounds, is added to the process. These additions are made at some convenient point in the process i.e. to the generator, to the cooling zone, or to the naphtha rundown tank in the carbon-recovery system. The amount of synthesized ammonia plus the supplemental ammonia from an external source is sufficient to neutralize said formic acid to a desired level noncorrosive to carbon-steel i.e., pH of 5 or higher.

In another embodiment of the invention, where it is desired to have the quench waters slightly acidic to prevent system upsetting emulsions from forming in the carbon recovery zone, the synthesized ammonia and the supplemental ammonia from an external source is supplied to said process in an amount sufficient to neutralize a portion of said formic acid to a pH level of 5 and higher but less than the stoichiometric quantity required to react with substantially all of said formic acid. That is, the pH of the quench water is maintained in the range between 5 to 7, inclusive.

It is therefore an object of the present invention to prevent corrosion of carbon-steel piping and equipment in a high pressure synthesis gas process.

It is another object of the present invention to improve the economy and efficiency of the continuous partial oxidation process by controlling the pH of the process.

Another object of this invention is to provide a continuous stream of noncorrosive synthesis gas.

A still further object of this invention is to improve the operation of a high pressure synthesis gas process by preventing the build-up in the system of gelatinous precipitates, corrosive formic acid and excess ammonia.

Still another object of this invention is to provide a carbon recovery process for purifying synthesis gas using light hydrocarbon liquid and fuel oil extractants, which process is fairly insensitive to the quality of said extractants and which is characterized by the absence of system upsetting emulsions.

DESCRIPTION OF THE INVENTION

In our copending application Ser. No. 834,879 filed June 19, 1969 continuous control of the pH in a high pressure synthesis gas generating process is accomplished by supplementing the nitrogen in the primary hydrocarbon fuel and oxygen-enriched gas fed to the generator with a controlled amount of nitrogen in the form of nitrogen containing organic compounds, and continuously neutralizing all or a portion of the formic acid produced in the system with ammonia synthesized in the system so as to main the pH of the system at a level of 5 and higher.

By the present invention, supplemental ammonia from an external source is introduced into the previously described process of our copending application in order to supplement the ammonia synthesized by said process, thereby correcting a deficiency of synthesized ammonia. For example, such a deficiency of synthesized ammonia may occur when the supplemental nitrogen containing organic compounds for blending with the primary hydrocarbon fuel are in short supply or they are low in nitrogen content.

Furthermore, the supplemental ammonia from an external source may be added to our process at any of several desirable locations and in any of several convenient forms. For example, the supplemental ammonia may be added to the process in the form of anhydrous ammonia or as ammoniacal compounds of the type which contain combined ammonia available for neutralization of HCOOH in the system in the presence of $H_2O$, i.e. ammonia, ammonium bicarbonate, ammonium carbonate, ammonium carbamate. These ammoniacal compounds may also be added to the reaction zone of the generator as a source for the supplemental nitrogen.

The supplemental ammonia from an external source may be added to the effluent gases as they leave the generator, to the water in the quench and scrubbing zones, or elsewhere in the system where local neutralization is desired, i.e. to the naphtha run down tank in the carbon-recovery system where it is desired to neutralize organic acid impurities in the naphtha.

By the process of our invention the nitrogen content of a primary hydrocarbon fuel stream and an oxygen containing gas stream is determined and responsive to said determination a controlled amount of supplemental nitrogen in the form of a stream of nitrogen containing compounds are introduced into the reaction zone of a high pressure synthesis gas generator to supplement the nitrogen in the primary hydrocarbon fuel and in the oxygen containing gas stream. The supplemental nitrogen is introduced into the reaction zone in the form of a stream of supplemental nitrogen containing compounds selected from the group consisting of ammoniacal compounds, hydrocarbyl amines, and organic nitrogen compounds naturally occurring in liquid hydrocarbon fuels, coal tar nitrogen bases, and petroleum distillation bottoms. Ammonia is continuously synthesized in said reaction and cooling zones by the non-catalytic reaction of the nitrogen supplied by said hydrocarbon fuel and said supplemental nitrogen containing compounds with a portion of the hydrogen being simultaneously produced by the process.

Furthermore, as previously described, a stream of a supplimental ammonia from an external source is added to the process to supplement the synthesized ammonia. This supplemental ammonia from an external source may be in the form of anhydrous ammonia, aqueous solutions of ammonia containing for examples 28 to 30 weight percent of ammonia, or aqueous solutions of ammoniacal compounds.

The nitrogen content in the reactant stream is maintained at a level so that the stream of ammonia which is continuously synthesized in the gas generation and quench zones and the stream of supplemental ammonia from an external source neutralize the formic acid simultaneously produced in the process to a desired level noncorrosive to carbon steel i.e. pH of 5 or higher. By this process, the pH of the system may be continuously controlled in a desired range, for example from 5 to 8.5.

A stream of hot synthesis gas comprising essentially of hydrogen and carbon monoxide and containing small amounts of $NH_3$, HCOOH, and particulate carbon is produced in the reaction zone by the partial oxidation of the nitrogen enriched hydrocarbon fuel with substantially pure oxygen or oxygen enriched air. The introduction of water into the reaction zone is optional, depending on the type of hydrocarbon fuel feed. The hot product gas from the reaction zone may be partially cooled by means of a heat exchanger such as a waste heat boiler followed by further cooling and scrubbing with water; or the hot product gas may be cooled by direct quenching in water in a cooling zone. By either cooling procedure, particulate carbon in the product gas is recovered as a slurry or dispersion of particulate carbon in water. Clarified water is then separated from the carbon-water slurry in a carbon recovery zone and the clarified water is then recycled to the cooling and scrubbing zones. The carbon recovery zone may include any suitable procedure for separating out clarified water from the carbon-water slurry, i.e. vacuum filtration, gravity separation.

Raising the pH of said quench and scrubbing waters or the pH of the condensate from said heat exchanger to a level which is noncorrosive to carbon-steel by means of this invention is encompassed by the meaning of the term "neutralize."

In a first embodiment of this invention, the formic acid produced in the partial oxidaiton system of generating hydrogen and carbon monoxide is controlled by continuously maintaining the molal concentration of ammonia synthesized in the system plus the supplemental ammonia from an external source greater than the molal concentration of the formic acid produced in the system regardless of their chemical states, so that the system and the materials therein falls within a pH range of 5 or higher, i.e. to about 8.5. Formic acid attack on the iron alloy process equipment is thereby prevented.

In another embodiment of this invention, the formic acid produced in the system is controlled by continuously maintaining the molal concentration of ammonia synthesized in the system plus the supplemental ammonia from an external source less than the molal concentration of the formic acid in the system, regardless of their chemical states so that the system and the materials therein fall in a pH range between 5 to 7 inclusive. Stated another way, the total amount of nitrogen supplied to the reaction zone plus the supplemental ammonia from an external source that is added to the system are sufficient to neutralize the formic acid produced in the system to a pH level of 5 or higher; but said amounts are less than the stoichiometric quantity required to react with substantially all of said formic acid. By controlling the pH of the quench water in this range not only is the attack on iron alloy process equipment prevented but water-carbon-liquid hydrocarbon emulsions and gelatinous precipitates are avoided in the carbon recovery zone.

The synthesis gas generator in our process consists of a compact, unpacked, freeflow, noncatalytic, refractory lined steel pressure vessel of the type described in U.S. Pat. 2,809,104 issued to D.M. Strasser et al., which patent is incorporated herewith by reference. Operating conditions in the reaction zone of the generator include the following: temperature 1800 to 3500° F., pressure 400 to 3000 p.s.i.g., and preferably 600 to 3000 p.s.i.g., atomic ratio of total oxygen to carbon in the feed (O/C ratio) about .80 to 1.5, and a weight ratio of steam to liquid hydrocarbon in the feed about 0.1 to 3.

At least fifty weight percent of the generator fuel consists of said original hydrocarbon fuel which by definition has been referred to as the primary hydrocarbon fuel feed to the reaction zone. The primary hydrocarbon fuel may be any of a wide variety of feedstocks suitable for use in the partial oxidation process including: natural gas, propane, butane, various petroleum distillates and residual lignite, bituminous and anthracite coals, naphtha, gas oil, residual fuel, reduced crude, whole crude, coal tar oil, shale oil and tar sand oil. Slurries of solid carbonaceous feedstocks in water or liquid hydrocarbons, are also suitable.

The oxygen containing gas may be substantially pure oxygen (99.5 mole percent $O_2$ containing 0% nitrogen), or oxygen enriched air (40 mole percent $O_2$ and higher).

Organic nitrogen compounds from an external source which may be used to supplement the primary hydrocarbon fuel by being introduced into the reaction zone along with the primary hydrocarbon fuel include: pyridines, carbazoles, indoles, pyrroles, quinolines and porphyrins. These nitrogen containing organic compounds may be supplied to the reaction zone individually, in combination, or as naturally present in varying amounts in liquid hydrocarbon fuels, petroleum distillation bottoms, and coal tar nitrogen bases. Other nitrogen containing organic compounds from an external source that may be supplied to and burned in the reaction zone along with the primary hydrocarbon fuel include hydrocarbyl amines containing from 1 to 50 carbon atoms or higher including primary, secondary and tertiary amines wherein the hydrocarbyl groups thereon comprise alkyl, aryl, cycloalkyl, their mix types and unsaturated analog groups, and crude sources of these compounds. Examples of these compounds include hexylamine, aniline, and sec-alkyl primary amines in the range of $C_{10}$ to $C_{14}$.

The nitrogen containing organic compounds and the ammoniacal compounds may be introduced into the reaction zone to supplement the nitrogen content in the primary hydrocarbon fuel feed by any suitable method, including the following:

(1) By blending a supplemental amount of nitrogen containing organic compound with the primary hydrocarbon fuel feed, and introducing the mixture into the reaction zone.
(2) By blending a supplemental amount of a liquid hydrocarbon fuel or coal tar nitrogen base containing naturally occurring organic nitrogen compounds with said primary hydrocarbon fuel feed, and introducing the mixture into the reaction zone.
(3) Introducing separate streams of the primary hydrocarbon fuel feed and the supplemental nitrogen containing organic compounds into the reaction zone.
(4) Supplemental ammoniacal compounds may be dissolved in water, vaporized to form steam, and introduced into the reaction zone along with the primary hydrocarbon fuel feed.
(5) Anhydrous ammonia may be introduced into the generator separately as a liquid under pressure or as a gas.

For example, to control the pH of the quench water at a level of 5 to 8.5 inclusive while at a quench water temperature in the range of about 300 to 650° F., about 5 to 50 weight percent and preferably 10 to 20 weight percent of a liquid hydrocarbon fuel containing about .30 to 3.0 weight percent of nitrogen or more in the form of naturally occurring nitrogen containing organic compounds may be blended with about 50 to 95 weight percent of the primary hydrocarbon fuel and the mixture introduced into the reaction zone. The amount of supplemental ammonia from an external source added to the system may vary then in an amount in the range of from about .03 to 3 pounds per hundred pounds of combined hydrocarbon feed (primary hydrocarbon fuel blended with nitrogen containing organic compounds), excluding any additional amounts necessary for neutralizing acidic materials introduced into the system by feedstreams downstream of the generator.

Similarly, under the same conditions, pH control of the quench waters to prevent corrosion may be effected by introducing a comparatively high nitrogen containing organic material into the reaction zone to supply a comparable amount of nitrogen, thereby supplementing the nitrogen in the primary fuel and oxygen-enriched air.

In a preferred embodiment of our invention, the hot gaseous effluent from the reaction zone comprising essentially hydrogen and carbon monoxide, and containing small amounts of particulate carbon, $CO_2$, $H_2O$, $H_2S$, $CH_4$, $NH_3$, and $HCOOH$ may be quickly cooled below the reaction temperature to a temperature in the range of 300 to 650° F. by direct quenching in water. The cooling water is contained in a carbon-steel quench vessel located immediately after the reaction zone of said gas generator.

A large diameter dip leg starting at the bottom end of the reaction zone and discharging beneath the water level in the quench tank serves as an interconnecting passage between the reaction zone and the quench zone through which the hot product gases pass. This also substantially equalizes the pressure in the two zones.

A concentric draft tube, open on both ends, surrounds said dip leg, creating an annulus through which the mixture of gas and water rises vigorously and splashes against the support plate of the reactor floor. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone.

Recycle water from the carbon recovery zone is normally introduced through a quench ring at the top of the dip leg to cool the metal at that point. Large quantities of steam are generated in the quench vessel and the quench chamber may be likened to a high output, high pressure boiler. Since the heat is transferred by direct contact rather than through metal, this boiler is relatively insensitive to scale-forming mineral solids but care should be taken to keep the pH above 5 to prevent corrosion. This pH control may be accomplished by the process of the invention. Because of the high concentration of hydrogen and the absence of oxygen, hydrogen sulfide and carbon dioxide in the product gas are not ordinarily corrosive to carbon-steel.

The turbulent condition in the quench tank, caused by the large volumes of gases bubbling up through said annulus space, helps the water to scrub the particulate carbon in the quench water. Additional steam required for any subsequent shift conversion step is picked up during quenching.

For a detailed description of the quench vessel, reference is made to U.S. Pat. No. 2,896,927, issued to R. E. Nagle et al., which is herewith incorporated by reference.

Alternately, the hot product gas stream from the reaction zone may be partially cooled by indirect heat exchange in a waste heat boiler. The entrained particulate carbon may be then scrubbed from the carrier gas by contacting and further cooling the effluent stream of product gas with quench water in a gas-liquid contact apparatus, for example a spray tower, venturi scrubber, bubble plate contactor, packed column, or in a combination of said equipment. The scrubbing water may be acidified by absorption of formic acid produced by the process and the pH controlled at a desired level as previously described. For a detailed description of cooling synthesis gas by means of a waste heat boiler and a scrubbing tower, reference is made to U.S. Pat. No. 2,980,523, issued to R. M. Dille et al.

We have found that, depending on the specific operating conditions, up to 1% of the carbon in the generator fuel may be converted into formic acid. The primary reaction is between carbon monoxide in the gaseous product stream and $H_2O$ in the reaction and quench zones. Some formic acid may be made also in the system by hydrogen reacting with carbon dioxide. The formic acid produced in the reaction zone passes with the product gas into the quench water where ionization takes place.

For economical operation, the quench water is sent to a carbon recovery zone where particulate carbon is removed and the clear water is recycled to the quench zone. When the synthesis gas generator is operated under steady-state conditions with large volumes of product gases being quenched in recycled water in the quench zone, the concentration of formic acid builds up rapidly in the system, turning the quench water acidic.

Unless prevented, the pH of the circulating water system falls to below 5, and at a temperature of about 300 to 650° F. the acidic water will attack the carbon-steel vessels and piping in the system at a rate of about .05 to 0.8 inch per year. About 200 to 2000 parts per million of soluble ferrous formate may be then formed. Due to the buffering action of the formate, large quantities of alkali would then be necessary to neutralize the acidity in the quench systems. Furthermore, the rate of corrosion is accelerated when the hot acidified quench water is at high velocity. For under such conditions, protective surface films are eroded, exposing fresh metal to attack.

The chief product of formic acid corrosion is water soluble ferrous formate which coats the particulate carbon dispersed in the quench water. When excess alkali is then added to the quench water gelatinous iron oxide hydroxide precipitates the quench water and also inside the pores of the particulate carbon. Carbon particles coated with iron hydroxide tend to become hydrophillic and accumulate at the interface between the water and the liquid hydrocarbon in the decanter in the carbon recovery zone. Control of the interface level then becomes difficult and operation of the decanter is blocked.

By the improvement of our invention, the above difficulties are avoided. The formic acid is neutralized as soon as it forms by reacting with ammonia synthesized in the generator and in the quench zone and by reacting with controlled additions of supplemental ammonia from an external source. Accordingly, the quench water is thereby maintained at a pH level where formic acid corrosion of carbon steel in the system is reduced to a minimum. Further, by keeping the pH at a level between 5 to 7, inclusive, the formation in the system of troublesome gelatinous iron hydroxide is avoided.

By this invention ammonia is continuously synthesized without a catalyst in an unpacked gas generator along with the product gas and reacted with by-product formic acid in the system to produce ammonium formate. Nitrogen for the ammonia synthesis may be derived from any of the following sources, individually or in combination: by cracking nitrogen compounds supplied in the hydrocarbon fuel feed stock enriched with supplemental nitrogen containing compounds to produce atomic N and the free radicals NH and $NH_2$; and, as elemental nitrogen in admixture with gaseous hydrocarbon fuels, or in admixture with the gaseous oxidant, such as oxygen-enriched air. In addition to the synthesized ammonia, supplemental ammonia from an external source is added to the process so that the combined synthesized ammonia plus the supplemental ammonia is sufficient to bring the pH of the system up to a desired level.

At the high temperatures and pressures prevailing in the reaction and cooling zones some of the hydrogen in the product gas combines with the nitrogen or the high energy nitrogen radicals supplied by the fuel or oxidant; and, by noncatalytic gas phase reactions ammonia is continuously synthesized. In this manner, about 30% of the nitrogen supplied in a liquid or solid hydrocarbon fuel as organic nitrogen compounds may be converted into ammonia. By controlling the quantity of nitrogen supplied to the generator, a continuous stream of ammonia may be synthesized to neutralize a desired amount of the formic acid then being simultaneously produced in the reaction and cooling zones.

In the carbon recovery zone of a preferred embodiment of our invention, the entrained particulate carbon in the effluent stream of gases from the synthesis gas generator is first contacted and collected in acidic rather than basic water in the quench zone of the generator. Any remaining particulate carbon in the effluent gases is then removed in a scrubbing zone that may include a venturi or orifice scrubber and a wash tower through which the raw synthesis gas from the quench zone passes. In another embodiment of the invention, wherein a waste heat boiler is used to cool the effluent gaseous stream from the generator reaction zone, the gaseous stream is first contacted with acidic water in a scrubbing zone as described in said preferred embodiment. In either embodiment, the particulate carbon (soot) is recovered by mixing the sootladen acidic water at a pH range between 5 to 7 inclusive with a light hydrocarbon liquid, such as straight-run naphtha. The oleophilic quality of the soot will then cause it to leave the water and disperse in the naphtha. There must be enough mixing to displace the water with which the soot is first wet and replace it by the naphtha. This may be accomplished with a mix valve or orifice.

In a decanter a clarified acidic water phase settles out and separates from the naphtha-carbon phase. The clarified acidic water phase is then removed from the bottom of the decanter and is recycled to the quench and scrubbing zone to cool the hot effluent gases from the reaction zone. The naphtha-carbon phase containing about 1 to 5 weight percent acidic water is removed from the top of the decanter and is mixed with fuel oil (or crude oil). This mixture is then introduced into a fractionation column. Naphtha is distilled off and the carbon stays with the residue oil in the still bottoms. This fuel oil-carbon slurry is commonly admixed with fresh fuel oil feed and recycled as feed to the generator.

The carbon-free naphtha from the top of the distillation column is collected in a naphtha run-down tank along with water and water insoluble organic acid impurities which may come over with the naphtha. These water insoluble organic acid impurities may be naturally found in impure naphtha or may be transferred to the naphtha from the fuel oil or crude oil in the distillation column. When naphtha containing these impurities is mixed with an alkaline carbon-water slurry, the slurry thickens and may become semi-solid, thereby upsetting the decanter.

One way for preventing this difficulty is to purify the naphtha of these water insoluble organic acids before the naphtha is mixed with the carbon-water slurry. A stream of all or a portion of the supplemental ammonia from an external source may be added to the naphtha in the run down tank. Water soluble ammonium salts are formed by the ammonia reacting with the organic acid impurities. These ammonium salts dissolve in the water, which separates from the purified naphtha upon standing. The water is then recycled to the quench or scrubbing zone where it is acidified with formic acid produced by the process.

Light hydrocarbon liquids which may be used to extract the carbon from the carbon-acidic-water slurry forming a light hydrocarbon liquid-carbon-acidic water slurry and a clarified acidic water phase in the decanter include the range of hydrocarbon liquids from straight-run light naphtha to light kerosene, depending upon the operating conditions of temperature and pressure. Ordinarily, these light hydrocarbon liquids may contain as impurities about 0.1 to 1% of various compounds, e.g. naphthenic and cresylic acids, phenols (such as the cresols, xylenols and higher homologues), heterocyclic nitrogen compounds. In an alkaline system, we have found that these impurities form emulsifiers and soaps which contribute to the formation of light hydrocarbon liquid-carbon emulsion containing a high water content (10 to 20 weight percent). By maintaining the materials in the carbon-recovery system at a pH range between 5 to 7 inclusive by the process of our invention these system upsetting emulsions are avoided.

Light hydrocarbon liquids are generally more expensive than heavy fuel oils as feedstock for the synthesis gas generator. Therefore, a low cost heavy fuel oil is usually mixed with the light hydrocarbon liquid-carbon-acidic water slurry from the decanter and in a distillation column the light hydrocarbon is then recovered for reuse. Heavy fuel oils suitable for use in this process include heavy distillates, crude oil, residual crude oil, Bunker fuel and No. 6 fuel oils, reduced crude, vacuum residue, and hydrocracking bottoms. These fuel oils may contain as impurities about 0.1 to 1% naphthenic, cresylic, and other cyclic organic acids which form emulsifiers in an alkaline system. However, the acidic water carried into the distillation column by the light hydrocarbon liquidacidic-water slurry will generally prevent these impurities from becoming effective emulsificants.

When reference is made to the term "emulsions" throughout the specification and claims, it is to be understood to include the thick semi-solids and gel-like slurries that may form in the decanter from carbon, light hydrocarbon liquid, water, cyclic organic acid or soap sludges. Also included are the non-Newtonian gels comprising about 94 weight percent water, heavy fuel ends, light hydrocarbon liquid, cyclic organic acids or soap, and carbon that may be found in the light hydrocarbon liquid stripper.

It is important to eliminate oxygen from all parts of the system, especially the circulating water system. Oxygen not only causes increased corrosion but contributes to emulsion problems. Absorption of oxygen compounds or oxidation of surface compounds increases sharply the tendency of soot to stabilize emulsions in the decanter. By means of chemical agents such as hydrazine and sodium sulfide, traces of oxygen may be scavenged from all feedstreams except the raw synthesis gas which is already oxygen-free. It is advisable to maintain the carbon-extraction unit as a closed system with air excluded and blanketed with nitrogen. Furthermore, it is recommended that the input streams of water, the circulating water and the liquid extractants should be deaerated by conventional methods. For example, see "Water Treatment for Industrial and Other Uses," by Eskell Nordell, chapter 9, Reinhold Publishing Co., 1951. Because of the high concentration of hydrogen and the absence of oxygen in the system, hydrogen sulfide and carbon dioxide in the product gas are not corrosive to carbon-steel.

The following relationship was unexpectedly found in the operation of a partial oxidation synthesis gas generator in the pressure range of about 600 to 3000 p.s.i.g. with liquid hydrocarbon fuels. With unbuffered water recycled to the quench zone of the generator from the carbon recovery zone and having a relatively low ionic content (pH between 4 and 8.5), the pH of that quench water may be correlated with the partial pressure of saturated steam in the quench zone corresponding to the temperature of the water leaving the quench zone and the content of nitrogen in the liquid hydrocarbon feed to the generator and in the gaseous oxidant, if any.

Thus, what is really being said is that in this embodiment of our invention there is a fixed relation between the nitrogen content of the liquid hydrocarbon feed and oxidant, partial pressure of the steam in the quench zone of the generator and the pH of the quench water. Furthermore, when a liquid hydrocarbon fuel (HC) is oxidized in a high pressure synthesis gas generator with 99.5 mole percent oxygen and steam is introduced into the reaction zone in an amount that provides a steam to liquid hydrocarbon weight ratio of less than about 0.7 and said quench zone is insulated to prevent heat loss and the temperatures of the water entering and leaving the quench zone and the temperature of the saturated steam in the quench zone are all substantially the same, the relationship between the aforesaid parameters may be expressed by Equation I:

$$pH = 2.8 \ln \frac{1950}{pp} + 2.4 \text{ (wt. percent nitrogen in HC feed)} \quad (I)$$

where: pH is used to designate the logarithm of the reciprocal of the hydrogen ion concentration in the quench water, $pp$ is the partial pressure in p.s.i.a. for saturated steam in the quench zone of the synthesis gas generator corresponding to the temperature of the water leaving the quench zone; and the wt. percent nitrogen in the HC feed refers to the total nitrogen in the hydrocarbon feed to the generator, that is the nitrogen in the primary hydrocarbon feed plus when present, the nitrogen in the supplemental feed of nitrogen containing compounds as previously described. The 99.5 mole percent $O_2$ contains no nitrogen.

Equation I may be used to determine the weight percent of nitrogen in the primary liquid hydrocarbon fuel by the steps of measuring the pH of the quench water before any supplemental nitrogen containing compounds is added to the primary liquid hydrocarbon fuel, measuring the temperature of the quench water and finding ($pp$) the partial pressure of the saturated steam in p.s.i.a. corresponding to said temperature from the standard tables for saturated steam, i.e. "Thermodynamic Properties of Steam" by J. H. Keenan and F. G. Keyes, John Wiley & Sons, Inc. and then solving Equation I. By substituting a desired pH to prevent corrosion i.e., 5 or more in Equation I at the same partial pressure ($pp$) of saturated steam in the quench tank as in the previous determination, the wt. percent of nitrogen in a blended fuel mixture comprising primary liquid hydrocarbon fuel and supplemental nitrogen containing compounds may be determined.

By subtracting the wt. percent nitrogen in the primary hydrocarbon fuel as previously determined from the wt. percent nitrogen in the blended fuel mixture, the weight percent of nitrogen in the supplemental nitrogen containing compounds which were added to the primary hydrocarbon fuel to raise the quench water to a desired pH level may be determined. Finally, by a nitrogen balance, the actual amounts of primary hydrocarbon fuel and supplemental nitrogen containing compounds may be calculated.

The pH of the quench water and the water in the carbon recovery zone is substantially the same, since as previously discussed, the quench zone and carbon recovery zone are part of the same circulating water system.

Equation II is similar to Equation I but in addition provides for an oxygen containing gas (oxidant) that contains some elemental nitrogen i.e., oxygen-enriched air. Elemental nitrogen supplied in gases such as the oxygen-enriched air is only half as effective as the nitrogen containing compounds. Otherwise, the terms and system operating conditions applicable to Equation II are the same as those defined previously in connection with Equation I.

$$pH = 2.8 \ln \frac{1950}{pp} + 240 \left( \frac{\text{lbs. nitrogen in HC feed} + \frac{1}{2} \text{(lbs. nitrogen in oxidant)}}{\text{lbs. HC feed}} \right) \quad (II)$$

Equation II may be used to determine the weight of nitrogen in the oxygen enriched air supplied to the reaction zone per unit weight of mixed hydrocarbon feed (primary hydrocarbon fuel + supplemental nitrogen containing compounds).

One procedure for doing this is to first measure the pH of the quench water when the mixed hydrocarbon fuel is burned in the generator with substantially pure oxygen containing 0% nitrogen, and by means of Equation I calculate the lbs. of nitrogen in the mixed hydrocarbon fuel per lb. of mixed hydrocarbon fuel. This value is then substituted in Equation II and the lbs. of nitrogen in the oxygen enriched air (oxidant) per lb. of mixed hydrocarbon fuel may be calculated for controlling the pH level of the quench water at a desired pH level, for example between 5 and 8.5, when the same operating conditions and feedstreams are held, substantially the same as in the first step.

The amount of supplemental nitrogen containing compounds in a mixed hydrocarbon (HC) feed required to raise the pH of the quench water to a desired level may be determined from Equation II in the manner described previously for Equation I.

First the generator is run with primary hydrocarbon fuel only and oxygen-enriched air and the pH and exit temperature of the quench water are measured. By substituting the measured pH and $pp$ (as determined from the tables of saturated steam) in Equation II, the expression for lbs. nitrogen in HC feed plus ½ lbs. nitrogen in oxidant divided by lbs. of HC feed is determined.

In the next step, insert in Equation II, the desired pH value for maintaining the quench water when substantially the same amount of mixed hydrocarbon (HC) feed is reacted in the generator with substantially the same amount of oxygen-enriched air and under substantially the same operating conditions as in the first step, and then calculate the expression for lbs. nitrogen in mixed HC feed plus ½ lbs. nitrogen in oxidant divided by lbs. of HC feed. By subtracting from the answer from this calculation the value for the same expression determined in the first step, the amount of supplemental nitrogen containing compounds may be determined.

Equation III is similar to Equations I and II but in addition provides for the addition to the process of supplemental ammonia ($NH_3$) from an external source. Otherwise, the same terms and system operating conditions previously stated with respect to Equations I and II are applicable to Equation III.

$$pH = 2.8 \ln \frac{1950}{pp} + 240 \left( \frac{\frac{\text{lbs. nitrogen}}{\text{in HC feed}} + \frac{\text{lbs. nitrogen in oxidant}}{2} + \frac{\text{lbs. NH}_3 \text{ added}}{0.381}}{\text{lbs. HC feed}} \right)$$

(III)

Equation III may be used to determine the lbs. of supplemental ammonia from an external source required to be added to the system to bring the pH of the quench water to a desired level. Preferably, the amount of supplemental ammonia from an external source that is added to the system is less than the ammonia synthesized in the system.

First, with no additions of supplemental ammonia from an external source, the weight percent of nitrogen in the supplemental nitrogen containing compounds required to bring the pH of the quench water to a level of 5 may be determined in the manner previously described by using Equation I when substantially pure oxygen is burned in the generator and Equation II when the gaseous (oxidant) is oxygen enriched air containing a known amount of nitrogen. Then at the same operating conditions, the amount of supplemental ammonia from an external source that is required to raise the pH of the quench water to a desired level greater than 5, for example 6.5, may be determined by using Equation III. Thus, if it is desired to raise the level of the quench water from a pH of 5 to 6.5, by substituting in Equation III 6.5 for pH, one may solve for the pounds of ammonia to be added to the quench water per hundred pounds of blended hydrocarbon fuel mixture, since all other terms in Equation III are now known.

Alternately, the amounts of supplemental nitrogen containing compound required to be added to the primary hydrocarbon fuel to raise the pH of the quench water to a level of 5, or higher may be determined experimentally. By experimentally, we mean that the system is operated with primary hydrocarbon fuel in each successive run being blended with an increased amount of supplemental nitrogen containing compounds of the type previously described, while maintaining substantially the same amount of mixed hydrocarbon fuel (HC) feed. The pH of the quench water is measured by standard testing methods after each run. The amount of supplemental nitrogen containing compounds required to raise the level of the quench water to the desired pH of 5 or higher is then noted.

Likewise, the amount of supplemental ammonia from an external source may be determined experimentally by maintaining the compositions of all other feedstreams constant while increasing stepwise the pounds per hour of ammonia added to the system, for example to the quench water in the quench tank, until the pH of the quench water has increased to the desired level.

The following examples are offered as a better understanding of the present invention, but the invention is not to be construed as unnecessarily limited thereto.

EXAMPLE I 628 pounds per hour of Arabian crude oil having a gravity of 34° API, a gross heating value of 19,308 B.t.u./lb., and 0.04 weight percent of nitrogen is heated to a temperature of 666° F. and charged into the 1.85 cubic foot reaction zone of a non-catalytic flow-type unpacked synthesis gas generator. Substantially pure oxygen (99.5 mole percent of $O_2$ or higher containing 0 mole percent of $N_2$) is preheated to 300° F. and supplied to said reaction zone at a rate of 5486 standard cubic feed per hour in admixture with 235 pounds per hour of 666° F. process steam. The resulting mixture of oil, steam and oxygen is reacted in the generator at an autogenous temperature of 2293° F. and a pressure of 1015 p.s.i.a.

26,876 standard cubic feet per hour of effluent gas is discharged from the reaction zone comprising in volume or mole percent (dry basis) about 43.8 carbon monoxide, 57.9 hydrogen, 5.8 carbon dioxide, 2.3 methane, and .08 hydrogen sulfide. In addition, present in the effluent gas from the reaction zone are about 1.5 weight percent of particulate carbon (basis carbon in the fuel), and small amounts of $H_2O$, $NH_3$, and HCOOH.

The effluent gas from the reaction zone is quickly cooled below the reaction temperature by being discharged into 5600 pounds per hour of water contained in a quench tank located immediately below the reaction zone. The quench tank is insulated so that the temperature of the water entering the quench tank and the water leaving the quench tank is about the same, i.e., 423° F. The partial pressure of saturated steam corresponding to this temperature as found in a standard table showing the properties of saturated steam i.e., Keenan and Keyes is 405 p.s.i.a. Large quantities of steam are generated in the quench tank having a partial pressure corresponding to the temperature of the water leaving the quench tank.

Additional formic acid is produced in the quench tank by the reaction of carbon monoxide and water. Also, additional ammonia is synthesized in the quench tank by the reaction of nitrogen radicals from the feed and hydrogen in the effluent gas. Further, the unconverted particulate carbon is stripped from the effluent gas stream by the vigorous scrubbing that the gaseous effluent gets as it passes through the water, and a slurry of particulate carbon and water is formed in the quench tank.

About 5600 pounds per hour of particulate carbon-water slurry is withdrawn from the quench tank and passed into a standard separation zone where clear water is separated from the particulate carbon and is recycled to the quench tank to recover particulate carbon from the effluent synthesis gas as previously described. Examples of standard separation zones include vacuum filters and gravity sedimentation vessels. After several hours of operation in the aforesaid manner, the system becomes stabilized and the pH of the water in the quench tank drops to about 4.5.

Continued operation of the system with the quench waters at this pH level will result in corrosion of the piping, valves and other equipment in the line made from carbon-steel.

By increasing the pH of the quench water to a level above 5, for example 5.4, the aforesaid corrosion may be substantially stopped. This may be accomplished by blending a portion of the aforesaid Arabian crude oil (referred to as the primary fuel) containing 0.04 weight percent nitrogen with a smaller amount of a comparatively high nitrogen containing liquid hydrocarbon fuel (referred to as the supplemental fuel), and feeding the mixture to the generator. For example, the supplemental fuel may be Wafra crude oil having an 23.6° API, a gross heating value of 18,495 B.t.u. per pound and a nitrogen content of 1.5 weight percent. The amount of primary fuel and blended fuel mixture is the same.

The amount of Wafra crude oil necessary for blending with the Arabian crude oil to raise the pH of the quench water to 5.4 may be determined experimentally or by use of Equation I.

The use of Equation I will be illustrated to determine the amount of Wafra crude oil required to be blended with Arabian crude oil to form a mixture, which when fed to the reaction zone will provide the quench water with the desired pH of 5.4. By substituting in Equation I, 5.4 for pH, 405 for $pp$ and solving, the wt. percent nitrogen in HC feed to the reaction zone (which represents in this case the weight percent of nitrogen in the mixture comprising Arabian crude oil and the Wafra crude oil) is determined to be 0.40 weight percent.

The amounts of primary and supplemental fuel in the mixture may be then determined by a nitrogen balance as follows, where X represents the lbs. per hr. of Wafra crude oil: 628 lbs. per hr. of mixed hydrocarbon feed (HC) times .004 lbs. of nitrogen per lb. of mixed hydrocarbon feed is equal to (628 $-X$) lbs. per hr. of Arabian crude oil times .0004 lbs. of nitrogen per lb. of Arabian crude oil plus X lbs. per hr. of Wafra crude oil times .015 lbs. of nitrogen per lb. of Wafra crude oil.

By either of the aforesaid procedures, it may be shown that 157 pounds per hour of Wafra crude oil blended with 471 pounds per hour of Arabian crude oil and introduced into the reaction zone as feed will raise the pH of the quench water to a level of 5.4. All of the other quantities and conditions as given in the previous run without the supplemental fuel remaining substantially the same, including the oxygen consumption and the analysis of the product gas.

In the previous example, the weight percent of nitrogen in the primary and supplemental liquid hydrocarbon fuels may be first determined by standard methods of chemical analysis or by means of Equation I, as previously described. The pH and temperature of the quench water may be determined by standard testing procedures.

Example II shows that the pH level of 5.4 as determined in Example I may be attained with a reduced amount of supplemental high nitrogen Wafra crude oil in the mixed hydrocarbon feed when the gaseous oxidant comprises oxygen enriched air containing some nitrogen.

By replacing the substantially pure oxygen (99.5 mole percent (containing no nitrogen) in Example I with oxygen-enriched air (97 mole percent $O_2$+0.5 mole percent $N_2$) in an amount sufficient to provide the same amount of $O_2$, while keeping all other conditions substantially the same, it may be shown that by substituting in Equation II 5.4 for pH, 405 for $pp$, 2.08 for lbs. Nitrogen in oxygen-enriched air, and 628 lbs. of mixed hydrocarbon (HC) feed and solving, the lbs. of nitrogen in the mixed hydrocarbon feed (HC) is determined to be 1.57. By a simple nitrogen balance it may be shown that the feed to the reaction zone will now comprise 538 lbs. per hr. of Arabian crude oil and 90 lbs. per hr. of Wafra crude oil. The total amount of mixed hydrocarbon feed (HC) remains the same, i.e. 628 lbs. per hr.

EXAMPLE III

The addition of supplemental ammonia from an external source to the quench water to supplement the synthesized ammonia is illustrated by Example III.

This example shows that the pH level of 5.4 as determined in Examples I and II may be attained with a further reduction in the amount of supplemental high nitrogen Wafra crude oil in the mixed hydrocarbon feed.

Substituting in Equation III 5.4 for pH, 405 for $pp$, 2.08 for lbs. nitrogen in 97 mole percent oxygen-enriched air containing 0.5 mole percent nitrogen, 628 for lbs. of mixed hydrocarbon feed (HC), and 0.5 lbs. of supplemental ammonia from an external source and solving, the lbs. of nitrogen in the mixed hydrocarbon feed (HC) is determined to be 0.96 or about 0.16 weight percent nitrogen. By a nitrogen balance it may be shown that the feed to the reaction zone may now comprise 563 lbs. per hr. of Arabian crude oil and 65 lbs. per hr. of Wafra crude oil.

EXAMPLE IV

The amount of supplemental anhydrous ammonia from an external source that may be added to the quench water in Example II in order to increase the pH to a higher level for example, 6.5 may be determined by substituting the following values in Equation III and solving: 6.5 for pH, 405 for $pp$, 1.57 for lbs. of nitrogen in the mixed hydrocarbon feed comprising 538 lbs. per hr. of Arabian crude containing 0.04 weight percent of nitrogen and 90 lbs. per hr. of Wafra crude oil containing 1.5 weight percent of nitrogen, 2.08 lbs. per hr. of nitrogen in the 97 mole percent oxygen-enriched air containing 0.5 mole percent nitrogen, and 628 lbs. per hr. of mixed hydrocarbon feed (HC). The ammonia added to the quench water to raise the pH to a level of 6.5 is determined to be 3.5 lbs. per hr.

The process of the invention has been described generally and by examples with reference to liquid hydrocarbon feedstocks, effluent synthesis gas streams, liquid extractants, and various other materials of particular compositions for purposes of clarity and illustration only. From the foregoing it will be apparent to those skilled in the art that the various modifications of the process and the materials disclosed herein can be made without departure from the spirit of the invention.

We claim:

1. In a process for producing snythesis gas in the reaction zone of an unpacked noncatalytic synthesis gas generator at an autogenous temperature in the range of about 1800 to 3000° F. by the partial oxidtion of a hydrocarbon fuel feed with an oxygen containing gas selected from the group consisting of substantially pure oxygen and oxygen enriched air, and optionally with $H_2O$, and quenching in a quench zone the hot effluent gases from said reaction zone comprising hydrogen, carbon monoxide, and a small amount of particulate carbon, and scrubbing the process gas stream leaving the quench zone in a scrubbing zone and separating particulate carbon from the process gas stream in a carbon-recovery zone, said hydrocarbon fuel feed being one which when subjected to partial oxidation at the elevated temperature and pressure of said process and quenched would in the absence of added nitrogen containing compounds produce a pH of less than 5 in the quench water, the improvement for preventing the corrosion of carbon-steel piping, valves, and equipment due to the formation of corrosive amounts of by-product formic acid in said process at an elevated pressure in the range of about 600 to 3000 p.s.i.g., which comprises introducing into said reaction zone along with said hydrocarbon fuel feed a supplemental amount of nitrogen containing compound selected from the group consisting of aqueous solutions of ammonium bicarbonate, ammonium carbonate or ammonium carbamate, hydrocarbyl amines containing 1 to 50 carbon atoms, and organic nitrogen compounds naturally present in liquid hydrocarbon fuels, petroleum distillation bottoms, and coal tar, and mixtures thereof, and introducing a supplemental amount of ammonia from an external source into either the hot effluent gases from said reaction zone, or into the quench zone, the scrubbing zone, or the carbon recovery zone, continuously synthesizing ammonia in said reaction and quench zone, and neutralizing said formic acid with said synthesized ammonia and said supplemental ammonia from an external source to a level non-corrosive to carbon-steel.

2. The process of claim 1 wherein the pH of the system is raised to a level of about 5 by said synthesized ammonia and then increased to a desired level greater than 5 by said supplemental ammonia from an external source.

3. The process of claim 1 wherein said supplemental nitrogen containing compounds are introduced into the reaction zone in admixture with said hydrocarbon fuel feed, said supplemental nitrogen containing compounds being present in said combined fuel mixture in the amount of 5 to 50 weight percent and containing from about 0.3 to 3 weight percent of nitrogen, and said supplemental ammonia from an external source is introduced into said process in an amount in the range of about 0.03 to 3 pounds per hundred pounds of combined fuel mixture.

4. The process as claimed in claim 1 wherein said hydrocarbon fuel feed is a liquid hydrocarbon fuel, and the hot effluent gases from the reaction zone are cooled and separated of particulate carbon by direct quenching in a quench zone with water at a temperature in the range of about 300 to 650° F. forming a water-carbon dispersion, said quench water being at a pH of 5 or higher.

5. The process of claim 4 wherein said quench water is acidified by the absorption of formic acid produced within the process and is at a pH in the range from 5 to 7 inclusive, and said particulate carbon is removed from said effluent gases, forming an acidic water-carbon dispersion.

6. The process of claim 5 with the added steps of mixing said acidic water-carbon dispersion with a light hydrocarbon liquid in a mixing zone so as to form a light hydrocarbon liquid-carbon-acidic water slurry and a clarified acidic water phase, separating the clarified acidic water phase from the light hydrocarbon liquid-carbon-acidic water slurry in a decanting zone, recycling said clarified acidic water phase to said quench zone, and separating particulate carbon from said light hydrocarbon liquid-carbon acidic water slurry in a distillation zone.

7. The process as claimed in claim 4 with the added step of deaerating said quench water to reduce the concentration of dissolved oxygen to below 0.005 parts per million.

8. The process of claim 1 wherein said supplemental nitrogen containing compound is selected from the group of compounds naturally occurring in hydrocarbon fuels and consisting of pyridines, carbazoles, indoles, pyrroles, quinolines, porphyrins, and mixtures thereof.

9. The process as claimed in claim 1 wherein said hydrocarbyl amines are selected from the group consisting of hexylamine, aniline, and sec-alkyl primary amine in the range of $C_{10}$ to $C_{14}$.

10. The process of claim 1 further provided with the step of introducing supplemental elemental nitrogen into said reaction zone in place of a portion of the nitrogen supplied by said supplemental ammonia producing compounds.

11. In a process for producing synthesis gas in the reaction zone of an unpacked noncatalytic synthesis gas generator at an autogenous temperature in the range of about 1800 to 3000° F. by the partial oxidation of a hydrocarbon fuel feed with an oxygen containing gas selected from the group consisting of substantially pure oxygen and oxygen enriched air, and optionally with $H_2O$, and cooling by indirect cooling in a cooling zone and scrubbing in a scrubbing zone the hot effluent gases from said reaction zone comprising hydrogen, carbon monoxide and a small amount of particulate carbon, said hydrocarbon fuel feed being one which when subjected to partial oxidation at the elevated temperature and pressure of said process and cooled by indirect heat exchange in a cooling zone and scrubbed in a scrubbing zone would in the absence of added nitrogen containing compounds produce a pH of less than 5 in the scrubbing water, the improvement for preventing the corrosion of carbon-steel piping, valves, and equipment due to the formation of corrosive amounts of byproduct formic acid in said process at an elevated pressure in the range of about 600 to 3000 p.s.i.g., which comprises introducing into said reaction zone along with said hydrocarbon fuel feed a supplemental amount of nitrogen containing compound selected from the group consisting of aqueous solutions of ammonium bicarbonate, ammonium carbonate or ammonium carbamate, hydrocarbyl amines containing 1 to 50 carbon atoms, and organic nitrogen compounds naturally present in liquid hydrocarbon fuels, petroleum distillation bottoms, and coal tar, and mixtures thereof, and introducing a supplemental amount of ammonia from an external source into either the hot effluent gases from said reaction zone, or into the cooling zone or the scrubbing zone, continuously synthesizing ammonia in said reaction and cooling zones, and neutralizing said formic acid with said synthesized ammonia and said supplemental ammonia from an external source to a level noncorrosive to carbon-steel.

12. The process of claim 11 wherein the hot effluent gases from the reaction zone are cooled to a temperature in the range of about 300 to 650° F. by indirect heat exchange in a waste heat boiler and by direct contact with water in a scrubbing zone in which said particulate carbon is removed from said effluent gases by forming a dispersion of carbon in scrubbing water at a pH of 5 or higher.

13. The process of claim 12 wherein said scrubbing water is acidified by the absorption of formic acid produced within the process and is at a pH in the range from 5 to 7 inclusive, and said particulate carbon is removed from said effluent gases, forming an acidic water-carbon dispersion.

14. The process claimed in claim 13 with the added steps of mixing said acidic water-carbon dispersion with a light hydrocarbon liquid in a mixing zone so as to form a light hydrocarbon liquid-carbon-acidic water slurry and a clarified acidic water phase, separating the clarified acidic water phase from the light hydrocarbon liquid-carbon-acidic water slurry in a decanting zone, recycling said clarified acidic water phase to said scrubbing zone, and separating particulate carbon from said light hydrocarbon liquid-carbon-acidic water slurry in a distillation zone.

15. The process as claimed in claim 12 with the added step of deaerating said quench water to reduce the concentration of dissolved oxygen to below 0.005 part per million.

References Cited
UNITED STATES PATENTS

| | | | |
|---|---|---|---|
| 2,700,677 | 1/1955 | Bowen et al. | 260—452 |
| 3,097,081 | 7/1963 | Eastman | 48—215 |
| 3,150,931 | 5/1961 | Frank | 23—213 |
| 3,473,903 | 10/1969 | Paul et al. | 48—212 |

FOREIGN PATENTS

| | | | |
|---|---|---|---|
| 3,923 | 8/1883 | Great Britain | 23—197 |

LEON ZITVER, Primary Examiner

A. SIEGEL, Assistant Examiner

UNITED STATES PATENT OFFICE
CERTIFICATE OF CORRECTION

Patent No. 3,759,837　　　　　　　　Dated September 18, 1973

Inventor(s) R. Dille - W. Schlinger

It is certified that error appears in the above-identified patent and that said Letters Patent are hereby corrected as shown below:

| | |
|---|---|
| Col. 3 line 48 | change "supplimental" to --supplemental-- |
| col. 6 line 33 | after "particulate carbon" insert --from the effluent gas, forming a dispersion of particulate carbon-- |
| col. 7 line 12 | after "water" insert a comma "," |
| col. 7 line 13 | after "precipitates" insert --in-- |
| col. 7 line 56 | after "converted into ammonia", insert the sentence --However, only up to 15% of the less-reactive elemental nitrogen supplied with gaseous fuels and gaseous oxidants may be converted into ammonia.-- |
| Col. 13 line 51 | after "percent" delete "(" |
| col. 16 line 8 | change "byproduct" to --by-product-- |

Signed and Sealed this third Day of February 1976

[SEAL]

Attest:

RUTH C. MASON　　　　　　　　C. MARSHALL DANN
*Attesting Officer*　　　　　　*Commissioner of Patents and Trademarks*